Feb. 4, 1969 N. HOGLUND 3,425,320
APPARATUS FOR FORMING CONTOURS
Filed Jan. 13, 1967 Sheet 1 of 5

INVENTOR.
NILS HOGLUND
BY William A. Zalesak
Attorney

Feb. 4, 1969 N. HOGLUND 3,425,320
APPARATUS FOR FORMING CONTOURS
Filed Jan. 13, 1967 Sheet 2 of 5

INVENTOR.
NILS HOGLUND
BY William A. Zalesak
Attorney

United States Patent Office 3,425,320
Patented Feb. 4, 1969

3,425,320
APPARATUS FOR FORMING CONTOURS
Nils Hoglund, 296 Hartshorn Drive,
Short Hills, N.J. 07078
Filed Jan. 13, 1967, Ser. No. 609,099
U.S. Cl. 90—13                                    5 Claims
Int. Cl. B23c 1/16, 1/18, 5/00

ABSTRACT OF THE DISCLOSURE

An apparatus having a cutting tool movable in a plurality of dimensions for forming contours of various kinds, including slots and apertures in a work piece and having an adjustable mechanism for increasing or decreasing the width of the cutting path of the cutting tool from a mean path.

Background of the invention

My invention relates to apparatus for forming contours in a plurality of dimensions on a work piece and particularly to improvements for controlling the cutting path of a milling tool, for example.

One form of apparatus utilizing my invention includes a base upon which is slidably mounted a housing which moves toward and from a work piece. A first slide is mounted at one end of the housing for movement transversely of the movement of the housing. A second or tool slide is mounted on the first slide and is movable transversely of the movement of the housing and first slide. To obtain movement of the housing and tool slide, a plurality of cams specifically three, are rotatably mounted on the housing at the end opposite the first and second slides. Followers mounted on other slides and the base cause movement of the housing and the first and tool slides, the cams and followers all being biased against each other.

A third slide mounted on the housing has a follower at each end, one engaging one of the rotatable cams and the other engaging a cam on the first slide. A fourth slide mounted on the base has a follower at each end, one engaging a second of the rotatable cams and the other a cam on the tool slide. A third follower is mounted on the base and is in contact with the third cam and controls movement of the housing.

In this form of apparatus to generate very accurately a certain width of the cutting path controlled by the cams, it is necessary to have exact size cutters, and cams which are not worn since adjustment for cam wear is not provided. If the cutters must be resharpened, the result is that the cutters become of smaller diameter. Thus, it is necessary to have cams of exact size as well as cutters of exact diameter to produce the desired accurate contours. Further, if different diameter cutters are available, there is no way to adjust the apparatus to accommodate these cutters. If it is desired to change the width, for example, of a slot being cut, no means are available to do this without making new cams.

It is therefore an object of my invention to provide an apparatus utilizing a cutting tool capable of providing contours in a plurality of directions and capable of being adjusted to compensate for tool wear and cam wear resulting from use of such apparatus.

Further, it is an object of my invention to provide for adjustment of the width of the cutting path of the tool as the tool and the controlling cams wear.

A further object is to provide means for utilizing different diameter cutting tools where desired while still cutting to the same dimensions.

Summary of the invention.

Apparatus of the kind described above is provided with an adjusting mechanism which causes the cutter path to be widened or narrowed as desired. For one of the cam and follower arrangements I substitute a double cam and follower arrangement, one half of one of the cams being relieved where the other half of the other cam is made to work. The two slides carrying the followers contacting the cams and which are slidable toward and from the cams are also slidable relative to each other. A pair of eccentrics, displaced 180°, contact the ends of the slides opposite the followers. Rotation of the eccentrics adjusts the relative position of the slides with respect to each other and the followers with respect to the cams.

Detailed description

Figure 1:
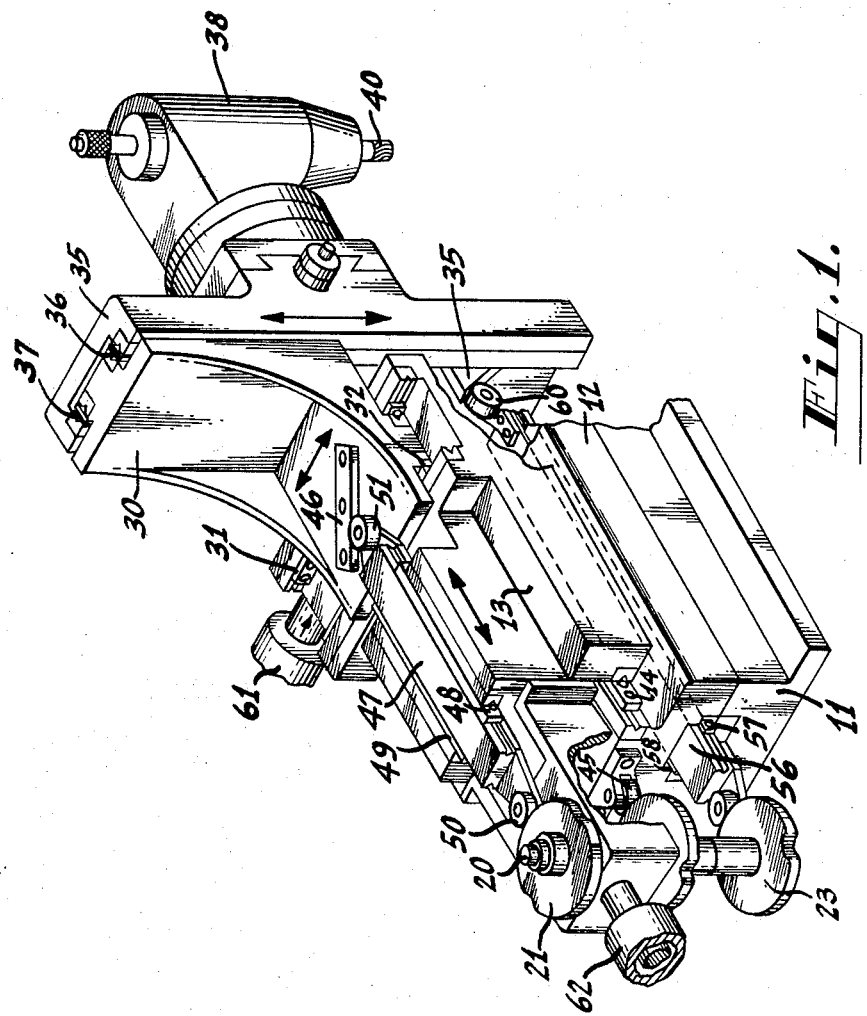
FIGURE 1 is a schematic perspective of one form of apparatus in which my invention may be utilized.

Referring now to FIGURE 1, apparatus utilizing my invention includes a base housing 11 and a subhousing 12. A slide or slide housing 13 is slidably supported in the subhousing 12 by means of ball bearing assemblies 14 (one on each side). Mounted at one end of the slide housing 13 is a rotatable shaft 20 upon which are supported and fixed the circular cams 21, 22 and 23. A motor (not shown) is connected to the shaft 20 by means of a gear train within the gear box or housing 27. Since the cams are all fixed to the same shaft, no error in the motion of the shaft will be caused by backlash or looseness between the three cams. The angular displacement of the cams will therefore be identical relative to the corresponding followers contacting the individual cams.

Mounted at the other end of the slide housing 13 is the slide mechanism 30 mounted on the bearing assemblies 31 and 32. This slide mechanism moves transversely of the movement of the slide housing 13. The tool slide 35 carrying the tool chuck 38 and tool 40 is slidably supported on slide mechanism 30 by ball bearing assemblies 36 and 37 for movement transversely and vertically of slide 30. The tool chuck 38 is driven by a motor not shown.

To provide movement of the various slides heretofore mentioned to cause the milling tool 40 to follow the desired path, sides, cams and cam followers to be described are provided.

The subhousing 12 has rotatably fixed thereto a cam follower 45 which contacts cam 22 on spindle 20. As cam 22 rotates housing 13 will move as indicated by the double headed arrow shown thereon, that is, this provides the X motion for the tool.

The slide mechanism 30 is provided with a cam 46 secured thereto. The side housing 13 slidably supports a slide 47 thereon by means of the ball bearing assemblies 48 and 49. Mounted at the ends of slide 47 are the roller cam followers 50 and 51 which contact the circular cam 21 and the cam 46. As cam 21 rotates it causes slide 47 to move toward slide 30 causing slide 30 to move as indicated by the double headed arrow shown thereon, that is horizontally and transversely of the slide housing 13. This movement gives the tool 40 its Y movement.

To give the tool 40 its vertical or Z motion, I provide the tool slide mechanism 35 with a ratio cam 55. A slide 56 is slidably mounted in the subhousing 12 in ball bearing assemblies 57 and 58. Roller cam followers 59 and 60 are mounted at the ends of the slide 56 contacting circular cam 23 and ratio cam 55. As slide 56 moves toward and from the tool slide 35, it causes vertical up-and-down movement of tool 40.

The hydraulically operated pistons 61 and 62 apply the necessary biasing forces as indicated to keep the various cams and followers in contact.

The apparatus above described is one form of apparatus for which my invention is suited.

Figure 2:
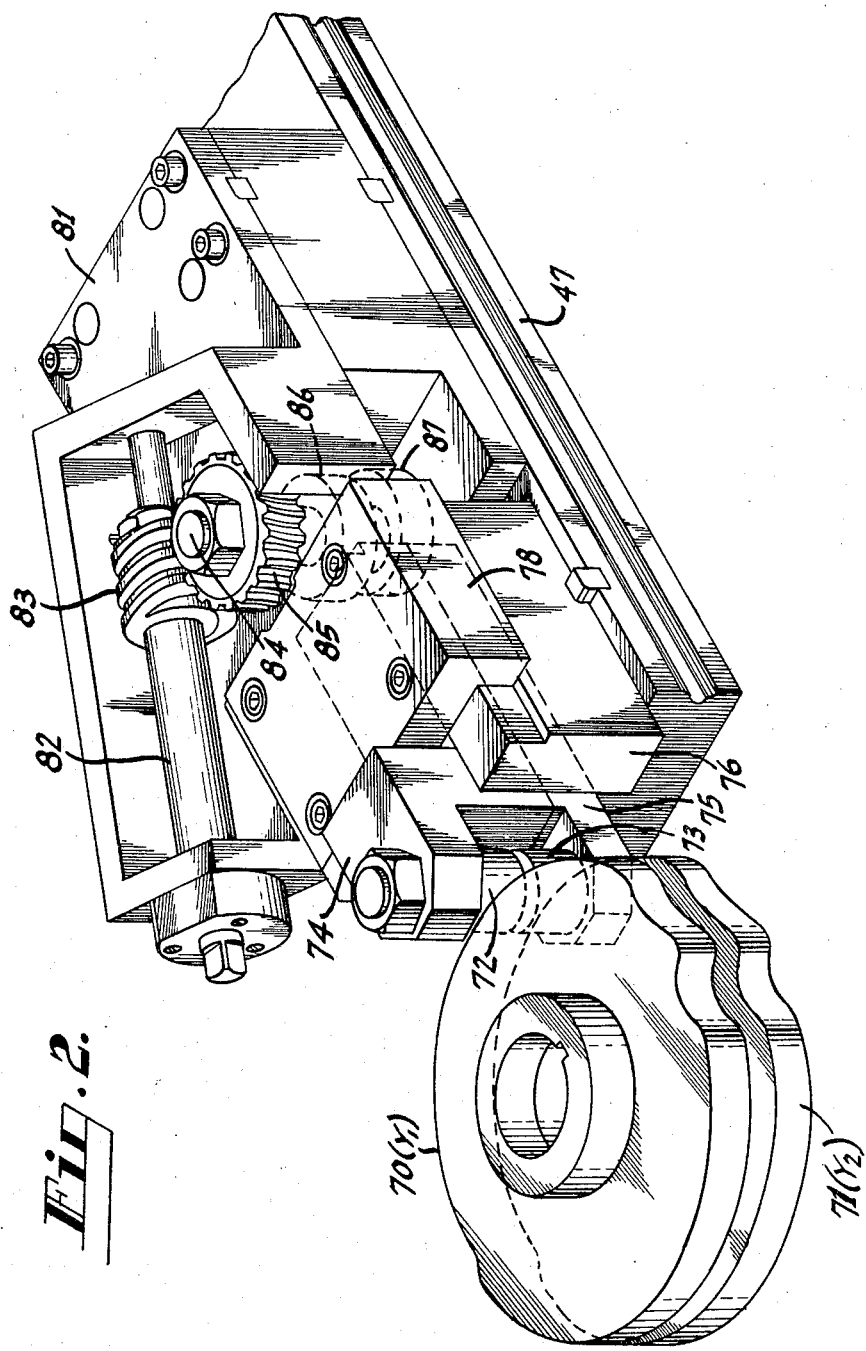
FIGURE 2 is a perspective view of the mechanism made according to my invention for controlling the width of the path of the cutting tool.
Figure 3:
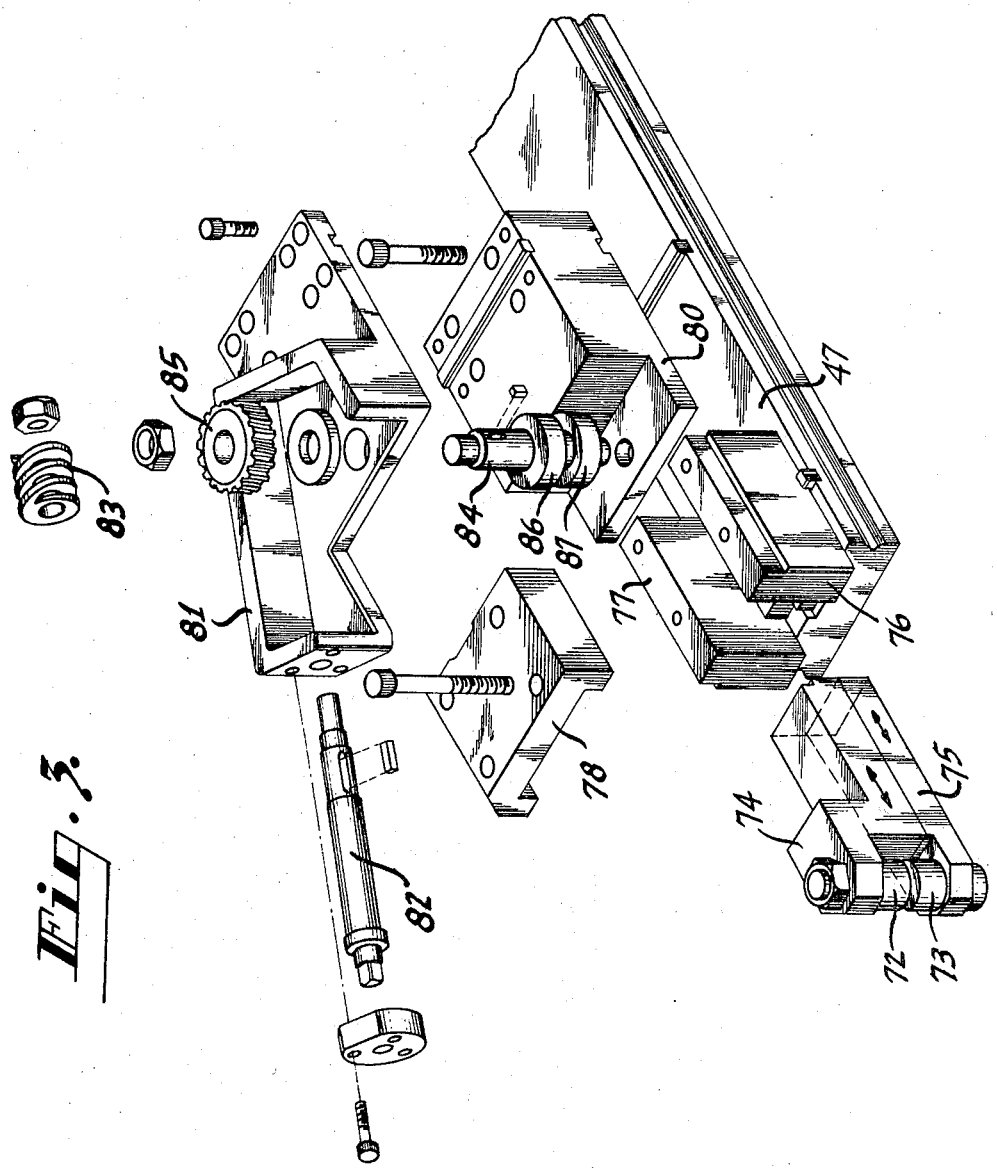
FIGURE 3 is an exploded view of the mechanism shown in FIGURE 2.

In accordance with my invention for the cam and follower arrangements 21 and 50, attached to slide 47 which controls the Y movement of the cutter, I substitute the cam and follower arrangement shown in FIGURES 2 and 3. In this arrangement one half of one of a pair of cams is relieved where the other half of the other cam is made to work.

Cams 70 ($Y_1$) and 71 ($Y_2$) are mounted on the shaft 20. Follower 72 is rotatably supported on slide 74 and follower 73 is mounted on slide 75. These slides are movable with respect to each other. These slides are supported in a frame fixed to slide 47. The frame consists of two side elements 76 and 77 and top element 78.

Means are provided for adjusting the position of the followers to control movement of the tool assembly 38 in the Y direction within small increments and for the purposes described above.

Attached to the slide 47 is a lower housing 80 supporting an upper housing 81. Rotatably mounted in the upper housing 81 is the shaft 82 which can be adjusted mechanically or otherwise. Mounted on the shaft 82 is the worm wheel 83. A shaft 84 is rotatably supported in the housing 81, 82 and carries the worm gear 85 and the two eccentric cams 86 and 87 displaced 180 degrees. As the shaft 82 is rotated, right or left, eccentrics 86 and 87 assume different rotational positions. These eccentrics are in contact with the slides 74 and 75 and thus alter the relative positions of the slides and followers 72 and 73 with respect to cams 70 and 71.

Figure 4:
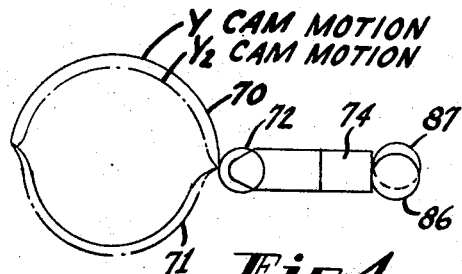
FIGURES 4 to 9, inclusive, are schematic diagrams of the cams and followers showing the various relationships for determining the different cutting tool path widths.
Figure 5:
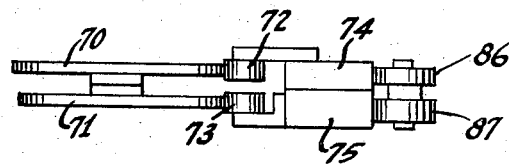
Figure 6:
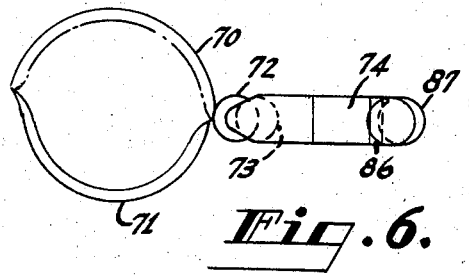
Figure 7:
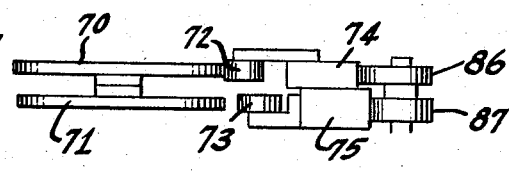
Figure 8:
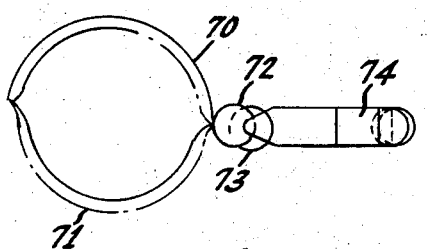
Figure 9:
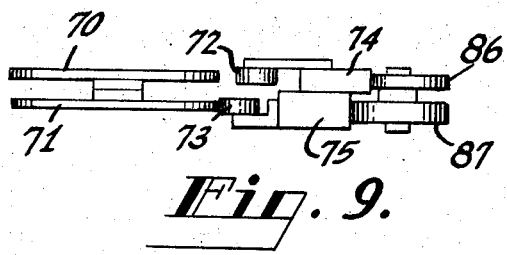
Figure 10:
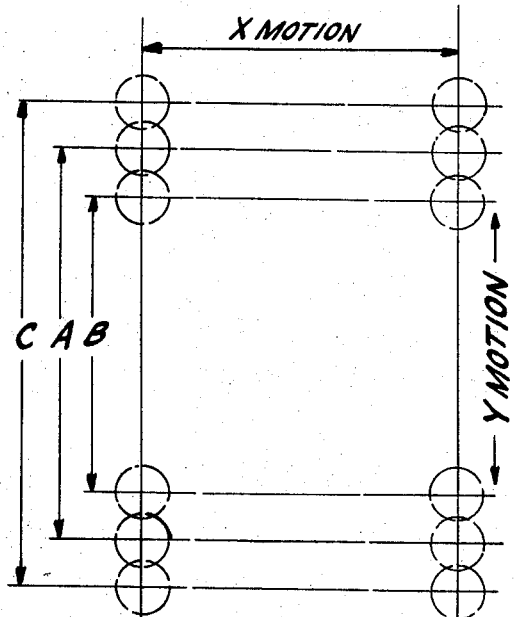
FIGURE 10 is a diagram showing the difference in width of the cutting tool path with respect to the relationships shown in FIGURES 4 to 9, inclusive.
Figure 11:
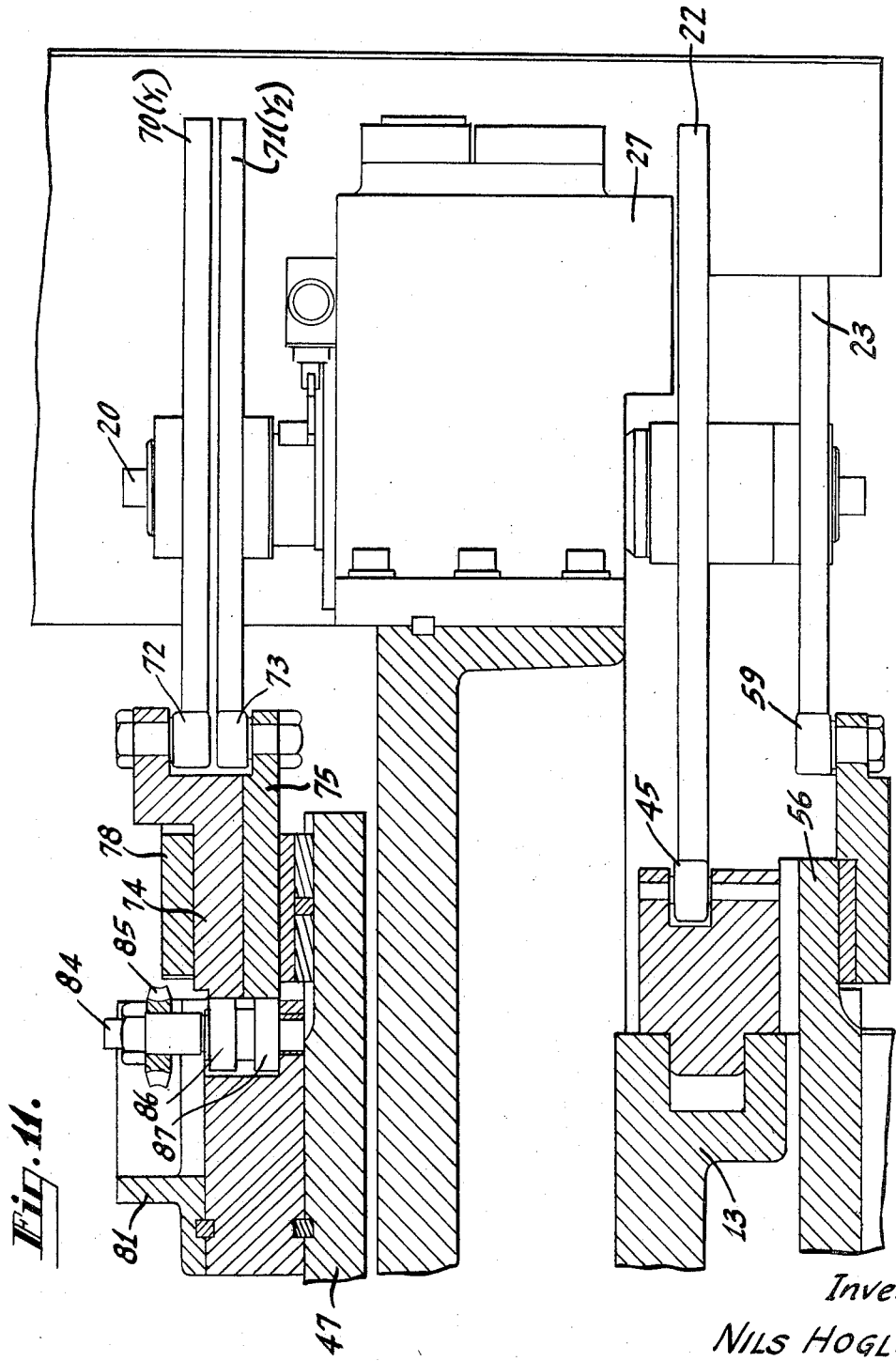
FIGURE 11 shows part of an actual apparatus in vertical section and in which my invention has been used.

In FIGURES 4 and 5, the followers 72 and 73 are in line and the Y motion is shown to be A in FIGURE 10. This might be referred to as the limits of movement of the cutting tool in the Y direction with a new cutter of the desired diameter and before wear sets in. In FIGURES 6 and 7, the lower follower is adjusted away from the cam and the upper follower is adjusted into the cam. The Y motion is that shown by C in FIGURE 10. The path of the cutter here is longer. This can take care of a worn cutter or a desire to make a longer cut. In FIGURES 8 and 9 the upper follower is adjusted away from its cam and the lower follower adjusted toward its cam. Movement B as shown in FIGURE 10 results. Thus a larger diameter cutter can be used or the length of the cutter path reduced.

The cams are made so that one half of the cam is relieved where the other half of the other cam is made to work. Thus, each cam is active for only part of a revolution, that is, for substantially 180 degrees no contact is made between the cam and its respective follower on the relieved portion (cutaway surfaces) of the cam. In setting up the equipment, the eccentrics are set as shown in FIGURE 4. Rotation of the eccentrics is made as desired. In effect, the two cams can be considered complementary.

What is claimed is:

1. Apparatus for forming contours including a support member, a first slide on said support member carrying a plurality of cams, a tool slide assembly mounted on said first slide and movable transversely of said first slide, a second slide on said first slide, said second slide and tool slide having cooperating cam and follower means thereon, a follower assembly on said second slide, means for biasing said first slide in a direction to maintain contact between said rotatable cams and said follower assembly, said follower assembly including a pair of followers, means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower surface of the other cam, said followers being in contact with their respective cams at different times during rotation of said cams, said means for adjusting said followers of said follower assembly including a pair of eccentrics mounted on said first slide on a common rotatable shaft and displaced 180 degrees with respect to each other, one of said eccentrics contacting one of said followers and the other of said eccentrics contacting the other of said followers, whereby upon rotation of said eccentrics in one direction one of said followers is moved toward said cams and the other follower is moved away from said cams, said adjustment providing variation in the movement of said tool slide assembly.

2. Apparatus for forming contours including a support member, a tool slide assembly mounted on said support member and movable transversely of said support member, a first slide on said support member, said first slide and tool slide having cooperating cam and follower means thereon, a follower assembly on said first slide, said follower assembly including a pair of followers, means for adjusting said followers toward and from said rotatable cams and relative to each other, said cams being adjacent to each other and having follower contacting surfaces and cutaway surfaces, the cutaway surface of one cam being proximately disposed to and substantially coextensive with the follower surface of the other cam, said followers being in contact with their respective cams at different times during rotation of said cams, said means for adjusting said followers of said follower assembly including a pair of eccentrics mounted on said supporting member on a common rotatable shaft and displaced 180 degrees with respect to each other, one of said eccentrics contacting one of said followers and the other of said eccentrics contacting the other of said followers, whereby upon rotation of said eccentrics in one direction one of said followers is moved toward said cams and the other follower is moved away from said cams, said adjustment providing variation in the movement of said tool slide assembly transversely of said support member.

3. Apparatus for forming contours including a support member, a first slide on said support member carrying a plurality of cams, a tool slide assembly mounted on said first slide and movable transversely of said first slide, a second slide on said first slide, said second slide and tool slide having cam and follower means thereon, a follower assembly on said second slide, means for biasing said first slide in a direction to maintain contact between said rotatable cams and said follower assembly, said follower assembly including a pair of followers, means for adjusting said followers toward and from said rotatable cams and relative to each other, said cams being adjacent to each other and having follower contacting surfaces and cutaway surface, the cutaway surface of one cam being proximately disposed to and substantially coextensive with the follower surface of the other cam, said followers being in contact with their respective cams at different times during rotation of said cams, a housing on said first slide, said means for adjusting said followers of said follower assembly including a pair of eccentrics mounted on said housing on a common rotatable shaft and displaced 180 degrees with respect to each other, one of said eccentrics contacting one of said followers and the other of said eccentrics contacting the other of said followers, whereby upon rotation of said eccentrics in one direction one of said followers is moved toward said cams and the other follower is moved away from said cams, said adjustment providing variation in the movement of said tool slide assembly.

4. Apparatus for forming contours including a support member, a first slide on said support member carrying a plurality of cams, a tool slide assembly mounted on said first slide and movable transversely of said first slide, a second slide on said first slide, said second slide and tool slide having cam and follower means thereon, a follower assembly on said second slide, means for biasing said first slide in a direction to maintain contact between said rotatable cams and said follower assembly, said follower assembly including a pair of slides having followers thereon, a housing on said first slide supporting the follower slides, means for adjusting said followers toward and from said rotatable cams and relative to each other, said cams being adjacent to each other and having follower contacting surfaces and cutaway surfaces, the cutaway surface of one cam being proximately disposed to an substantially coextensive with the follower surface of the other cam, said followers being in contact with their respective cams at different times during rotation of said cams, a second housing on said first slide, said means for adjusting said followers of said follower assembly including a pair of eccentrics mounted on a common rotatable shaft mounted in said second housing and displaced 180 degrees with respect to each other, one of said eccentrics contacting one of said followers and the other of said eccentrics contacting the other of said followers, whereby upon rotation of said eccentrics in one direction one of said followers is moved toward said cams and the other follower is moved away from said cams, said adjustment providing variation in the movement of said tool slide assembly.

5. Apparatus for forming contours including a support member, a first slide on said support member carrying a plurality of cams, a tool slide assembly mounted on said first slide and movable transversely of said first slide, a second slide on said first slide, said second slide and tool slide having cam and follower means thereon, a follower assembly on said slide, means for biasing said first slide in a direction to maintain contact between said rotatable cams and said follower assembly, said follower assembly including a pair of slides having followers thereon, a housing on said first slide supporting the follower slides, means for adjusting said followers toward and from said rotatable cams and relative to each other, said cams being adjacent to each other and having follower contacting surfaces and cutaway surfaces, the cutaway surface of one cam being proximately disposed to an substantially coextensive with the follower surface of the other cam, said followers being in contact with their respective cams at different times during rotation of said cams, a second housing on said first slide, said means for adjusting said followers of said follower assembly including a pair of eccentrics mounted on a common rotatable shaft mounted in said second housing and displaced 180 degrees with respect to each other, one of said eccentrics contacting one of said followers and the other of said eccentrics contacting the other of said followers, and means for rotating said shaft including a worm wheel mounted on second housing and a worm gear on said rotatable shaft for rotating said shaft through minute angles, whereby upon rotation of said eccentrics in one direction one of said followers is moved toward said cams and the other follower is moved away from said cams, said adjustment providing varation in the movement of said tool slide assembly.

References Cited

UNITED STATES PATENTS

| 2,557,876 | 6/1951 | Kelema | 90—62 |
| 3,169,448 | 2/1965 | Hoglund | 90—13 |
| 3,309,950 | 3/1967 | Weaver | 90—13 |

GERALD A. DOST, *Primary Examiner.*

U.S. Cl. X.R.

90—62